Patented Nov. 15, 1949

2,488,303

UNITED STATES PATENT OFFICE 2,488,303

NONDISCOLORING COATING COMPOSITION

Gerry P. Mack, Jackson Heights, N. Y.

No Drawing. Application August 14, 1946,
Serial No. 690,616

7 Claims. (Cl. 106—180)

The present invention relates to coating compositions and particularly to lacquer type coating compositions.

Although the present invention has a broad application to transparent or colored coating compositions containing natural and synthetic plastic materials and particularly cellulosic or resinous materials, it will be particularly described in its relationship to clear or transparent cellulosic ester or ether coatings such as coatings of cellulose acetate, and ethyl cellulose and especially cellulose nitrate or nitrocellulose coatings.

It is among the objects of the present invention to provide a non-greening and non-blooming cellulose nitrate lacquer composition which may be applied to metal compositions containing copper, such as bronze and brass, with assurance that discoloration will not arise even over prolonged periods.

It is also an object of the present invention to provide anti-greening and non-blooming lacquer stabilizer which will have proper solubility in lacquer solvents as well as sufficiently limited water solubility and which will prevent formation of greenish colored copper salts soluble in the dried lacquer film in sufficient quantities to darken such film.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

It has now been found that many of the difficulties experienced with clear nitrocellulose films containing malic acid or similar organic acids or esters thereof with alkyl groups ranging from 1 to 8 carbon atoms, may be eliminated by using aliphatic compounds containing hydroxylated and particularly di- or poly- hydroxy alkyl groups as esterifying agents.

It has further been found that esters of glycols having from 2 to 14 carbon atoms and preferably from 6 to 10 carbon atoms are most satisfactory, when they are combined with hydroxy organic acids. Generally the final ester should have two esterified carboxyl groups and at least two hydroxyl groups, there being more than two hydroxyl groups in cases where dibasic hydroxy acids or polyhydroxy acids are used.

The preferred ester is an ethyl hexane diol ester of glycolic acid namely 2-ethyl hexane diol-1,3-di glycolate having an acid number of approximately 53 which is accomplished by not carrying out the esterification to completion but stopping esterification when the desired acid number is reached, generally between 20 to 70. The ester is then used as such and not neutralized and washed with water to reduce acidity as is ordinarily done in practice when making esters that are used as plasticizers. Generally the esters should have an acid number between 20 to 70 and preferably between 50 and 60 and should have between 8 and 14 carbon atoms. These inhibiting compounds are then used in amounts ranging from 0.75 to 2.0% in the lacquer.

Among the other glycols which may be used are:

Ethylene glycol
Diethylene glycol
Triethylene glycol
Propylene glycol
Butylene glycol Among the other acids which may be used are:

Malic acid
Tartaric acid
Citric acid
Lactic acid
Beta-hydroxy propionic acid
Beta-hydroxy butyric acid As typical examples of the prepartion of compounds which may be as greening inhibitors in clear nitrocellulose lacquers:

Example I 1 mol of 2-ethyl hexanediol-1,3 and 2 mols of glycolic acid are reacted until the acid number is 50. This product then is ready for use as an inhibitor.

Example II 1 mol of di-ethylene glycol and 2 mols of glycolic acid are reacted until the acid number is 65.

Example III 1 mol of 2-ethyl hexanediol-1,3 and 2 mols of lactic acid were reacted together at 125° C. to 150° C. until the acid number is 55.

Example IV 1 mol of 2-ethyl hexanediol-1,3 and 2 mols of beta hydroxy butyric acid were reacted together at 125° C. to 150° C. until the acid number is 60.

Example V 2 mols of 2-ethyl hexanediol-1,3 and 1 mol of malic acid were reacted together at 125° C. to 150° C. until the acid number is 65.

Example VI 1 mol of citric acid and 3 mols of propylene glycol were reacted together at 125° C. to 150° C. until the acid number is 50.

Example VII 1 mol tartaric acid and 2 mols of 2-ethyl hexanediol were heated together at 125° C. to 150° C. until the acid number is 45.

As a typical lacquer to which the inhibiting agent of the present application may be added, the following is given:

| | Percent by weight |
|---|---|
| Cellulose nitrate (½ sec. viscosity) | 25 |
| Butyl acetate | 30 |
| Toluene | 30 |
| Ethanol | 15 |
| | 100 |

To the above lacquer were added various quantities of 2-ethylhexanediol-1,3 di-glycolate having an acid number of approximately 53. Copper strips were then immersed in the lacquer with the stabilizer, and the length of time required for the lacquer to green was noted, as shown in the table below:

| Percent Stabilizer | Days for Lacquer to Green |
|---|---|
| 0.00 | 3 days. |
| 1.125 | 21 days. |
| 0.250 | 30 days. |
| 0.330 | 40 days. |
| 0.500 | 60 days. |
| 0.750 | No greening after 70 days. |
| 1.00 | Do. |
| 2.00 | Do. |

The above was repeated using 2-ethylhexanediol-1,3 with an acid number of 75 to 120 and similar results were obtained.

To the above lacquers plasticizers such as castor oil, dibutyl phthalate, tricresyl phosphate, dibutyl sebacate, methyl oleate, and methyl ricinoleate may be used without affecting the action of the glycol ester inhibitors.

Resins such as ester gum, shellac, glycerolphthalic acid resins, and dewaxed dammar, and other resins miscible in nitro cellulose lacquers may be used.

Organic solvents such as esters, alcohols, ethers and hydrocarbons may also be used without disadvantageously affecting the inhibiting action.

As many changes could be made in the above anti-greening agents and coating containing the same and many apparently widely different embodiments of this invention could be made without departing from the scope of the claims, it is intended that all matter contained in the above description shall be interpreted as illustrative and not in a limiting sense.

The term "nitrocellulose lacquers" as used in the specification and appended claims is intended to denote in the conventional and accepted sense nitrocellulose in a suitable solvent or solvent mixture together with one or more suitable plasticizers and with or without compatible resins.

What is claimed is:

1. A non-greening nitrocellulose lacquer for use in coating metal articles containing copper, said lacquer containing between about 0.75% to 2.00% of an aliphatic diol ester of an aliphatic hydroxy carboxylic acid, said ester containing only carbon, hydrogen and oxygen.

2. A non-greening nitrocellulose lacquer for use in coating metal articles containing copper, said lacquer containing between about 0.75% to 2.00% of a glycol ester of glycolic acid, said ester containing only carbon, hydrogen and oxygen.

3. A non-greening nitrocellulose lacquer for use in coating metal articles containing copper, said lacquer containing between about 0.75% to 2.00% of 2-ethylhexane-diol-1, 3-di-glycolate.

4. A non-greening nitrocellulose lacquer for use in coating metal articles containing copper, said lacquer containing between about 0.75% to 2.00% of 2-ethylhexane-diol-1, 3-malate.

5. A non-greening nitrocellulose lacquer for use in coating metal articles containing copper, said lacquer containing between about 0.75% to 2.00% of diethylene glycol-glycolate.

6. A non-discoloring coating composition for use in coating metal articles containing copper, comprising a film forming material and a small amount of an aliphatic diol ester of an aliphatic hydroxy carboxylic acid as a discoloration inhibitor, said ester having an acid number between 20 and 70 and containing only carbon, hydrogen and oxygen.

7. A non-discoloring coating composition for use in coating metal articles containing copper, comprising nitrocellulose, a solvent therefor, a resin compatible with the solvent and nitrocellulose, and a small amount of an aliphatic diol ester of an aliphatic hydroxy carboxylic acid, as a discoloration inhibitor, said ester having an acid number between 20 and 70 and containing only carbon, hydrogen and oxygen.

GERRY P. MACK.

REFERENCES CITED

The following references are of record in the file of this patent:

UNITED STATES PATENTS

| Number | Name | Date |
|---|---|---|
| 2,017,070 | Lazier | Oct. 15, 1935 |
| 2,107,203 | Lock | Feb. 1, 1938 |
| 2,207,702 | Straughn | July 16, 1940 |
| 2,231,729 | Meyer | Feb. 11, 1941 |
| 2,290,128 | Loder | July 14, 1942 |